United States Patent [19]

Miyadera

[11] Patent Number: 5,359,465
[45] Date of Patent: Oct. 25, 1994

[54] DEVICE AND METHOD FOR EDITING SIGNALS RECORDED ON DISK

[75] Inventor: Shunichi Miyadera, Tokyo, Japan

[73] Assignee: Asahi Kogaku Kogyo Kabushiki Kaisha, Tokyo, Japan

[21] Appl. No.: 5,297

[22] Filed: Jan. 19, 1993

[30] Foreign Application Priority Data

Jan. 20, 1992 [JP] Japan ................................ 4-046434

[51] Int. Cl.⁵ ...................... G11B 27/02; H04N 5/78; H04N 5/225
[52] U.S. Cl. .................................... 360/35.1; 360/13; 358/909.1
[58] Field of Search ................. 360/35.1, 57, 13, 10.2, 360/57; 358/906, 909

[56] References Cited

U.S. PATENT DOCUMENTS

| | | | |
|---|---|---|---|
| 4,614,981 | 9/1986 | Fukui | 358/337 |
| 4,746,993 | 5/1988 | Tada | 360/35.1 X |
| 4,849,832 | 7/1989 | Yamagata et al. | 360/57 X |
| 4,970,608 | 11/1990 | Fukuda et al. | 360/14.1 |
| 5,115,357 | 5/1992 | Nakamura | 360/35.1 X |
| 5,153,740 | 10/1992 | Sato | 358/310 |
| 5,274,617 | 12/1993 | Terashima | 360/57 X |

OTHER PUBLICATIONS

*Microsoft Windows User's Guide*, pp. 32-33, 132-133, © Microsoft Corp. 1985-1990.

Primary Examiner—Andrew L. Sniezek
Assistant Examiner—Jennifer Pearson
Attorney, Agent, or Firm—Sandler Greenblum & Bernstein

[57] ABSTRACT

A device and method for editing a signal recorded on a magnetic disk. An image signal recorded on a first track of the disk is stored in a first memory, and then the signal of the first track is erased. An image signal recorded on a second track of the disk is stored in a second memory, and then the signal of the second track is erased. The signal stored in the first memory is recorded on the second track, and then the signal stored in the second memory is recorded on the first track.

16 Claims, 14 Drawing Sheets

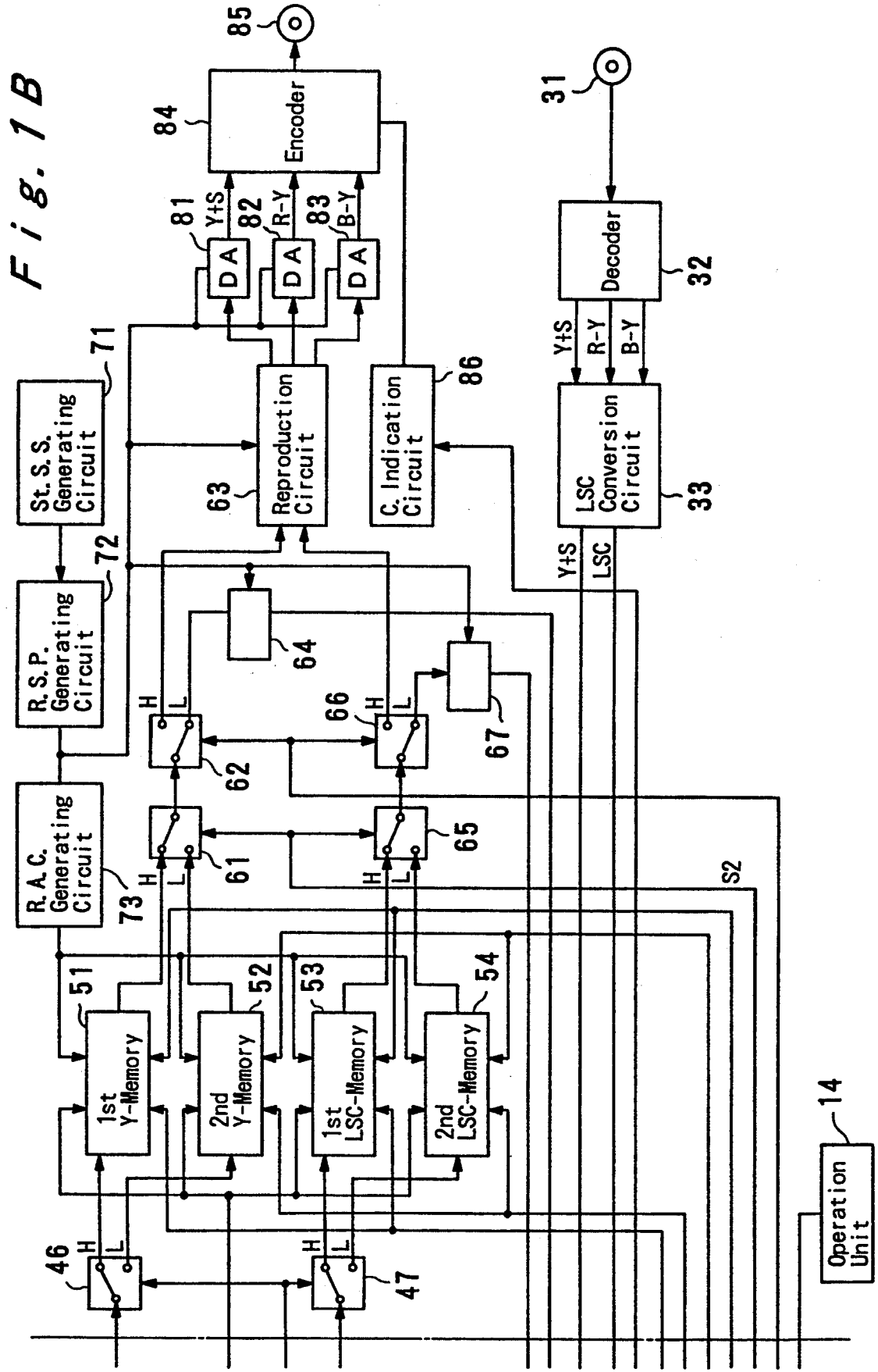

Fig. 12

| n | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| State { V(n) | F | F | F | 1 | 2 | 0 | 0 | F | F | F | F | 2 | 1 | 2 | F | F | F | F | F | 0 | F | F | F | F | 1 |
| Before { W(n) | 1 | 1 | 1 | 1 | 1 | 0 | 0 | 1 | 1 | 1 | 1 | 1 | 1 | 1 | 1 | 1 | 1 | 1 | 0 | 0 | 0 | 1 | 1 | 1 | 1 |
| Editing { f(n) | 0 | 0 | 0 | 1 | 2 | 0 | 0 | 1 | 0 | 1 | 1 | 1 | 1 | 2 | 1 | 1 | 1 | 0 | 0 | 0 | 0 | 0 | 0 | 0 | 1 |
| x(n) | 1 | 2 | 0 | 0 | 4 | 5 | 3 | 10 | 9 | 8 | 11 | 12 | 13 | 14 | 17 | 18 | 15 | 0 | 21 | 0 | 16 | 22 | 23 | 24 | 25 |

| n | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|
| State { V(n) | 2 | 1 | 2 | F | F | F | F | 1 | 2 | F | F | F | 2 | F | F | 0 | 0 | F | F | F | 1 | 2 | 1 | F | F |
| Before { W(n) | 1 | 1 | 1 | 1 | 1 | 1 | 1 | 1 | 1 | 1 | 1 | 1 | 1 | 1 | 1 | 0 | 0 | 1 | 1 | 1 | 1 | 1 | 1 | 1 | 1 |
| Editing { f(n) | 2 | 1 | 1 | 0 | 0 | 0 | 0 | 1 | 1 | 1 | 1 | 1 | 1 | 1 | 1 | 0 | 0 | 1 | 0 | 1 | 1 | 2 | 1 | 1 | 1 |
| x(n) | 26 | 27 | 28 | 29 | 49 | 31 | 32 | 33 | 34 | 35 | 36 | 37 | 38 | 39 | 40 | 43 | 0 | 0 | 44 | 45 | 46 | 47 | 48 | 30 | 50 |

Fig. 13

|    | 1 | 2 | 3 | 4 | 5 | 6 | 7 | 8 | 9 | 10 |
|---:|---|---|---|---|---|---|---|---|---|----|
|  0 | F | F | F | 1 | 2 | 0 | 0 | F | F | F  |
| 10 | 1 | 2 | 1 | 2 | F | F | F | F | 0 | 0  |
| 20 | F | F | F | F | 1 | 2 | 1 | 2 | F | F  |
| 30 | F | F | 1 | 2 | F | F | 1 | 2 | F | F  |
| 40 | 0 | 0 | F | F | 1 | 2 | 1 | 2 | F | F  |

Fig. 14

|    | 1 | 2 | 3 | 4 | 5 | 6 | 7 | 8 | 9 | 10 |
|---:|---|---|---|---|---|---|---|---|---|----|
|  0 | 1 | 2 | 0 | 0 | 4 | 5 | 3 |   |   |    |
| 10 |   |   |   |   |   |   |   |   |   |    |
| 20 |   |   |   |   |   |   |   |   |   |    |
| 30 |   |   |   |   |   |   |   |   |   |    |
| 40 |   |   |   |   |   |   |   |   |   |    |

DEVICE AND METHOD FOR EDITING SIGNALS RECORDED ON DISK

BACKGROUND OF THE INVENTION

1. Field of the Invention

The present invention relates to an editing device provided in a still video device, which can operate in a field mode and a frame mode, and by which an image signal recorded on a track of a magnetic disk is transferred to another track of the magnetic disk.

2. Description of the Related Art

In a conventional still video device, an editing operation in which the order of image signals recorded on each of the tracks of a magnetic disk is rearranged in accordance with a predetermined order can be carried out. In this editing operation, initially, two still video devices which can record and reproduce image signals are connected to each other, and a magnetic disk on which signals have been recorded is loaded in one of still video devices, while a magnetic disk on which no signal has been recorded is loaded in the other still video device. Then, the recorded magnetic disk is reproduced in a predetermined track order, so that the reproduced image signals are recorded on predetermined tracks of the non-recorded magnetic disk.

As described above, in the prior art, two still video devices and two magnetic disks are needed to carry out the editing operation, and therefore, space in which these devices are placed is needed.

SUMMARY OF THE INVENTION

Therefore, an object of the present invention is to carry out the editing operation of signals recorded on a recording medium such as magnetic disk, using only one device.

According to the present invention, there is provided a device for editing signals recorded in recording areas of a recording medium used for a still video device, the device comprising a first memory, a second memory, means for storing, means for erasing and means for reading.

The first memory and the second memory have capacities such that a signal recorded in one recording area of the recording medium can be stored in each memory, respectively. The storing means store a signal recorded in a first recording area of the recording medium in the first memory, and store a signal recorded in a second recording area of the recording medium in the second memory. The erasing means erase the signal recorded in the first recording area, after the storing means store the signals in the first and second memories. The reading means then read the signal recorded in the second memory to record the signal onto the first recording area.

Further, according to the present invention, there is provided a still video editing device comprising two memories, means for storing, means for erasing and means for reading.

The two memories have capacities such that a signal recorded on one track of a disk can be stored in each memory, respectively. The storing means store an image signal recorded on a first track of the disk in one of the memories, and store an image signal recorded in a second track of the disk in the other of the memories. The erasing means erase at least one of the image signals recorded on the first and the second tracks, after the storing means stores the image signals in the memories. The reading means then reads the image signal recorded in the other track from the memory and records the image signal onto the track from which the image signal has been erased.

Furthermore, according to the present invention, there is provided a still video editing device comprising, two memories in which an image signal recorded on one track of a disk can be stored, respectively, and means for transferring an image signal recorded on a track of the disk to the other track of the disk through one of the two memories.

Furthermore, according to the present invention, there is provided a method for editing signals recorded in recording areas of a recording medium used for a still video device which has a first memory and a second memory in each of which a signal recorded in one recording area of the recording medium can be stored, respectively, the method comprising a step of storing, a step of erasing and a step of reading.

In the storing step, a signal recorded in a first recording area of the recording medium is stored in the first memory, and a signal recorded in a second recording area of the recording medium is stored in the second memory. In the erasing step, the signal recorded in the first recording area is erased. In the reading step, the signal recorded in the second memory is read to be recorded to the first recording area.

BRIEF DESCRIPTION OF THE DRAWINGS

The present invention will be better understood from the description of the preferred embodiments of the invention set forth below, together with the accompanying drawings, in which:

FIGS. 1A and 1B are jointly a block diagram showing a circuit of a still video device to which an embodiment of the present invention is applied;

FIG. 12 is a table showing an example of variables used in each of the programs shown in FIGS. 2 through 11;

FIG. 13 is a table showing an example in which a variable V(n) shown in FIG. 12 is indicated on a monitor; and FIG. 14 is a table showing a setting condition of the editing operation of each track, the setting condition being indicated on a video monitor.

DESCRIPTION OF THE PREFERRED EMBODIMENTS

Figure 1A:
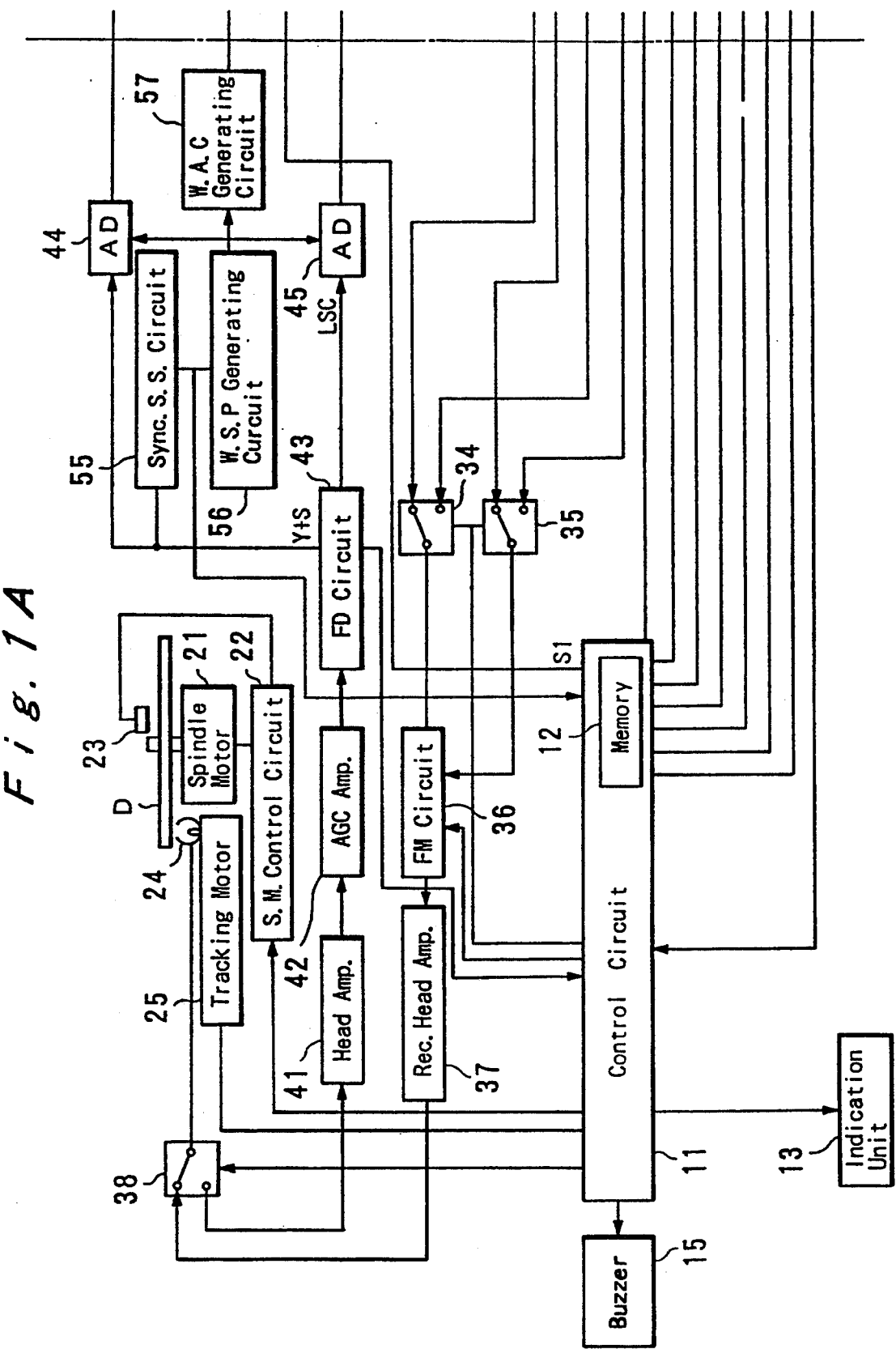
Figure 2:
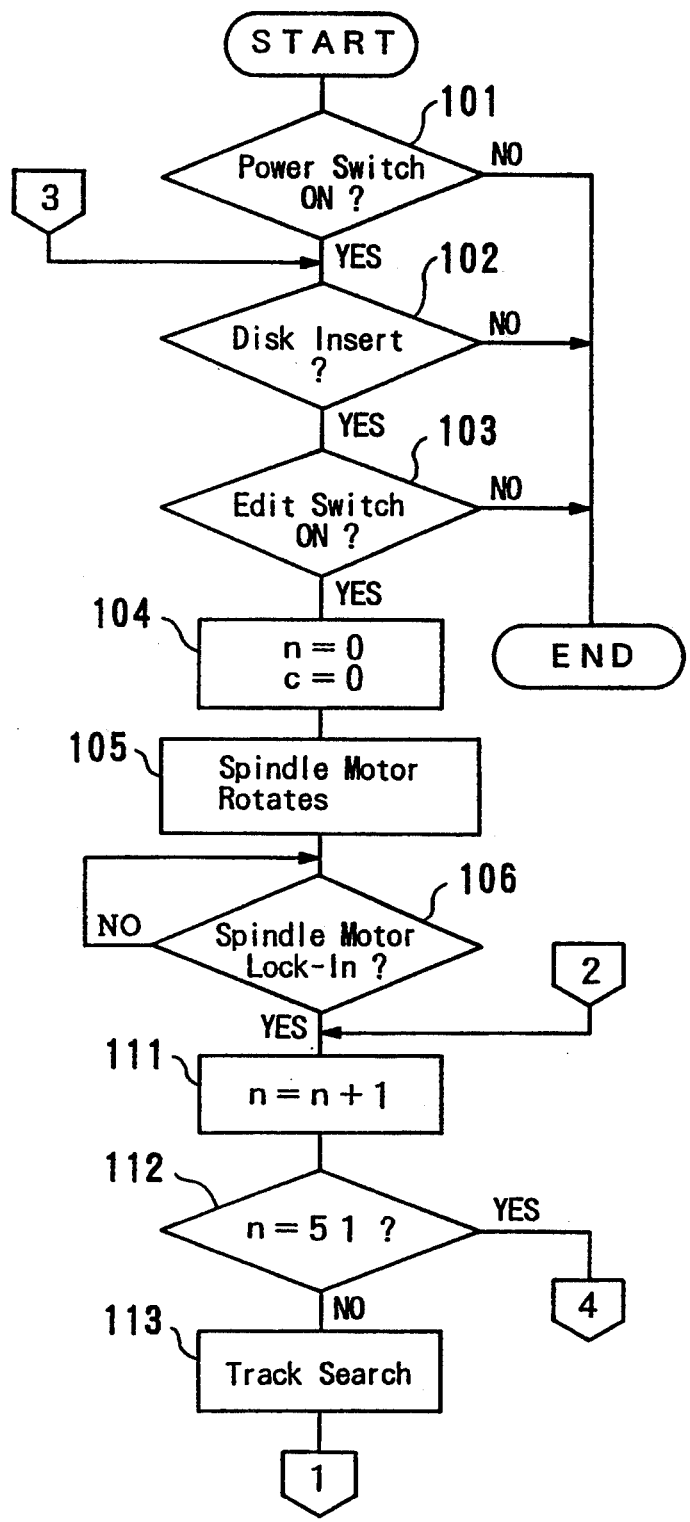
FIG. 2 is a flowchart of a main program, the flowchart showing a first half of a process of sensing a recorded state of a magnetic disk.
Figure 3:
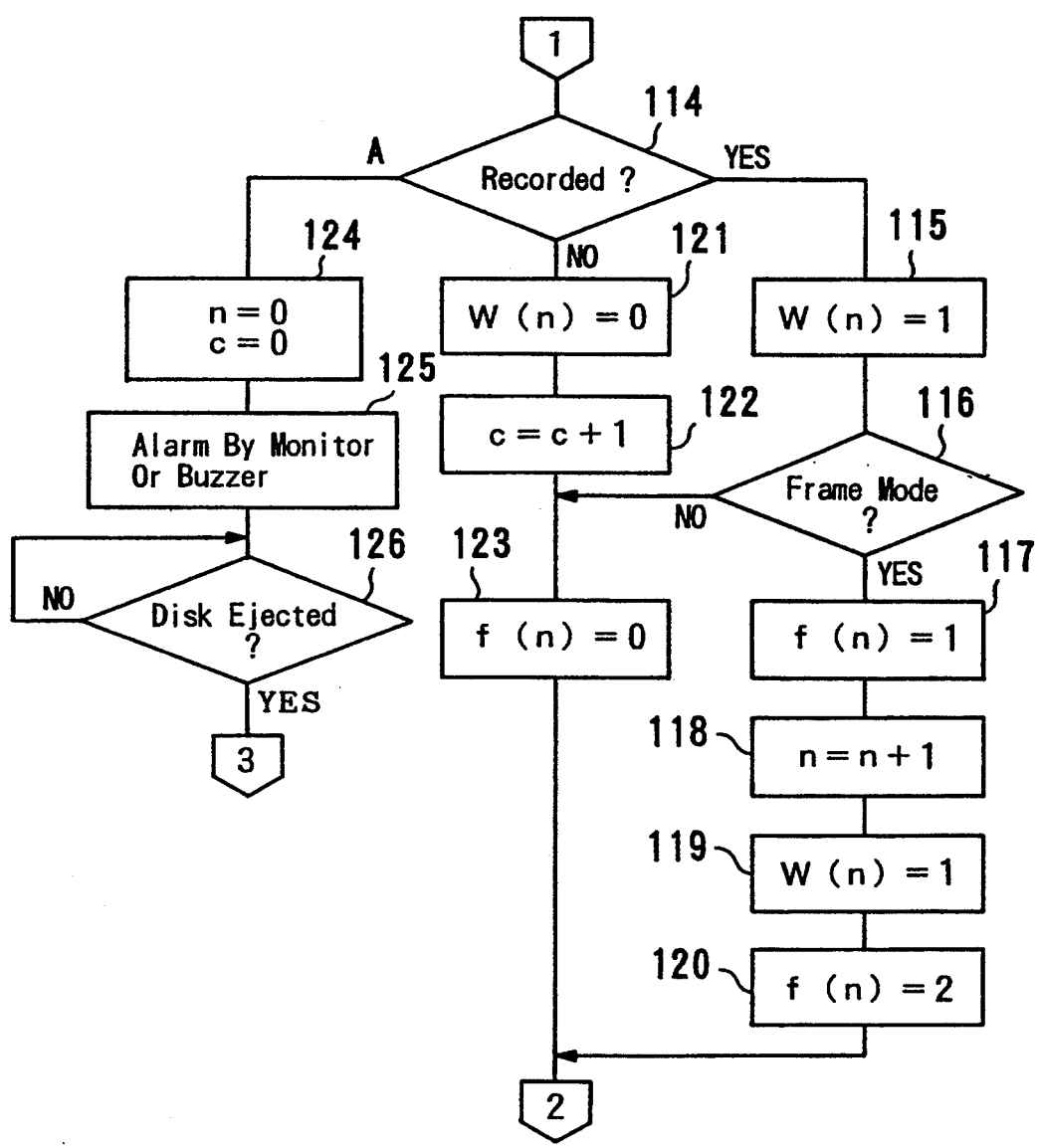
FIG. 3 is a flowchart of the main program, the flowchart showing a latter half of the process of sensing the recorded state.
Figure 4:
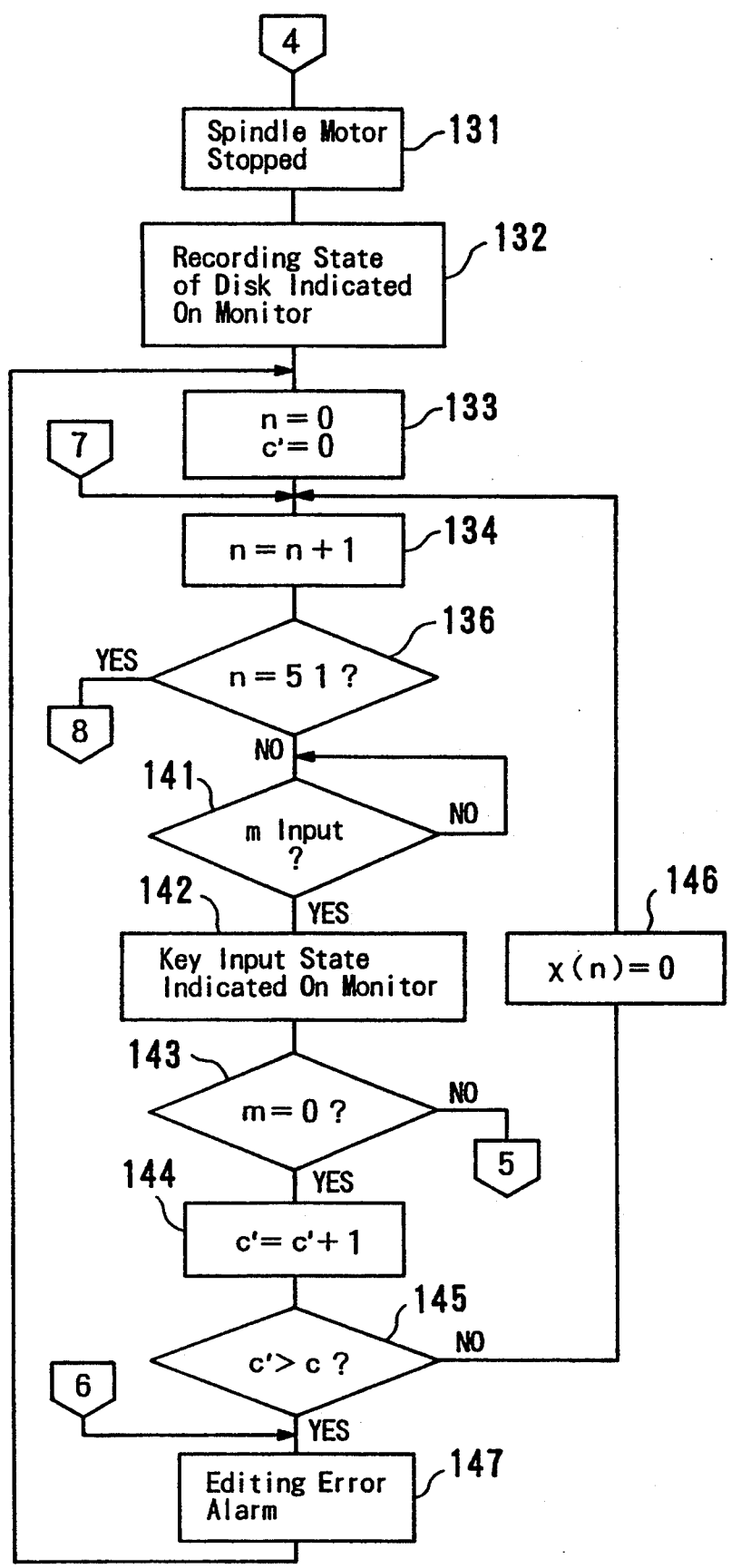
FIG 4 is a flowchart of the main program, the flowchart showing a first half of a process of determining a recorded state after an editing operation.
Figure 5:
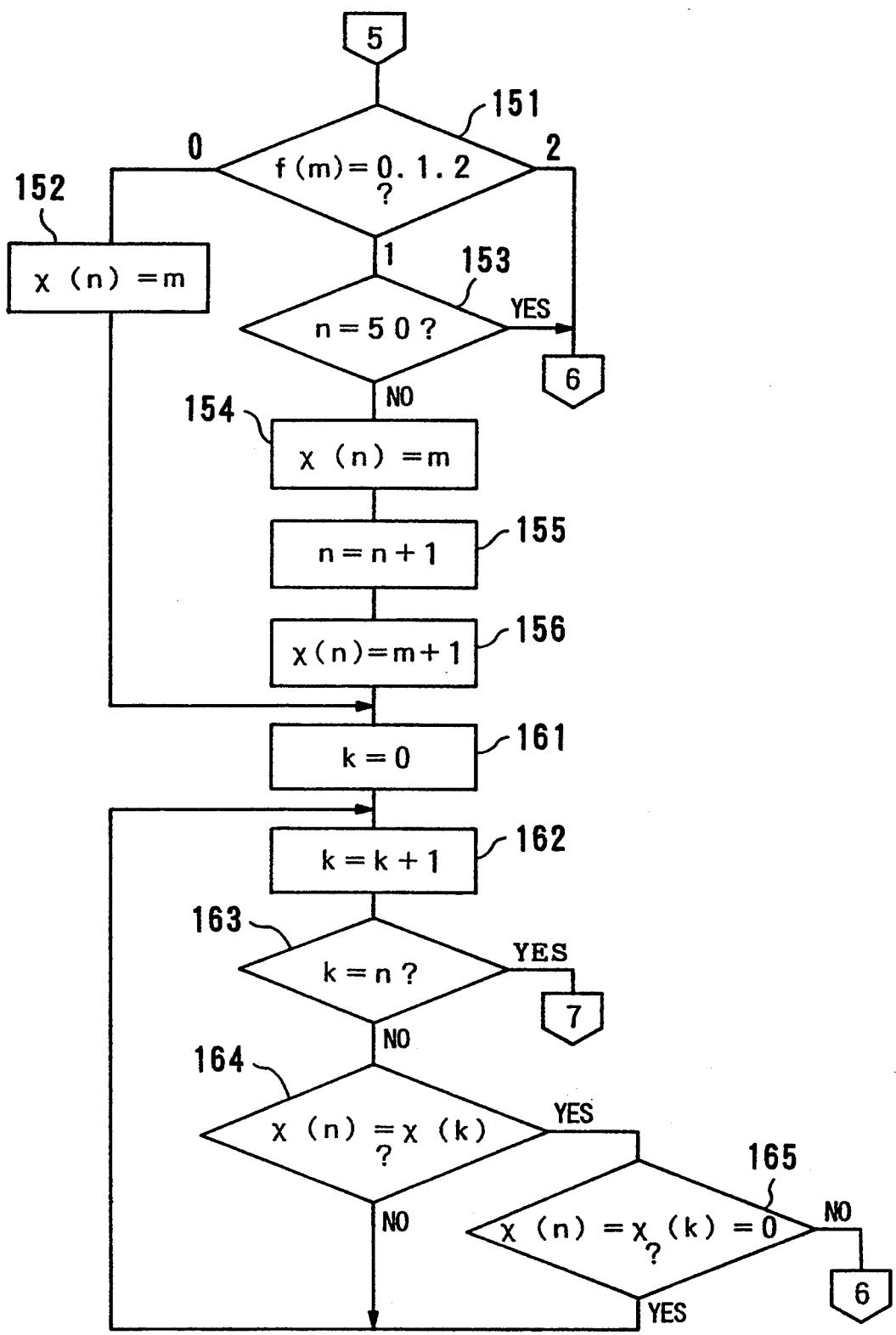
FIG. 5 is a flowchart of the main program, the flowchart showing a latter half of a process of determining a recorded state after the editing operation.
Figure 6:
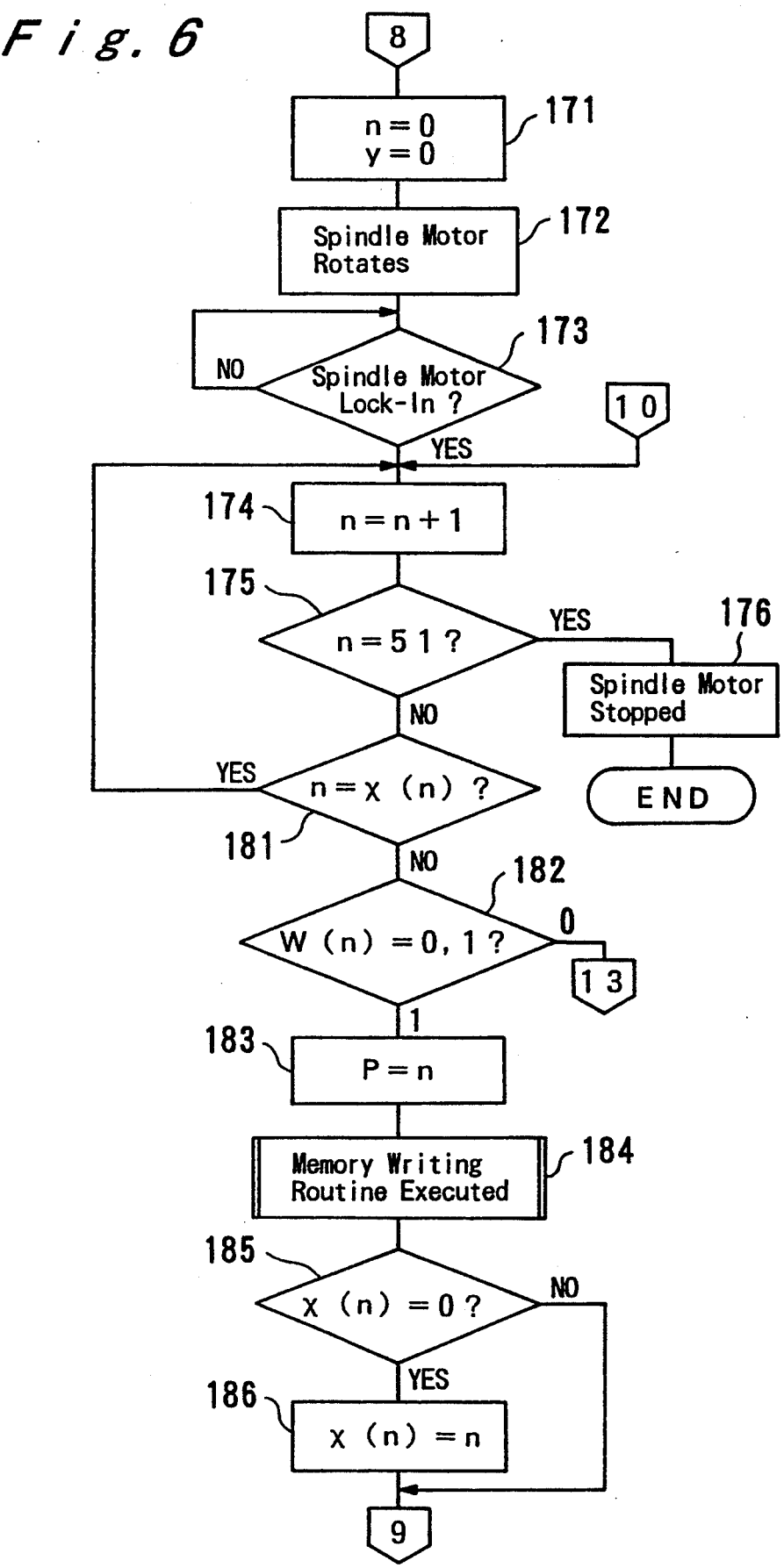
FIG. 6 is a flowchart of the main program, the flowchart showing a first part of a process in which the contents of each track are transfered to another track.
Figure 7:
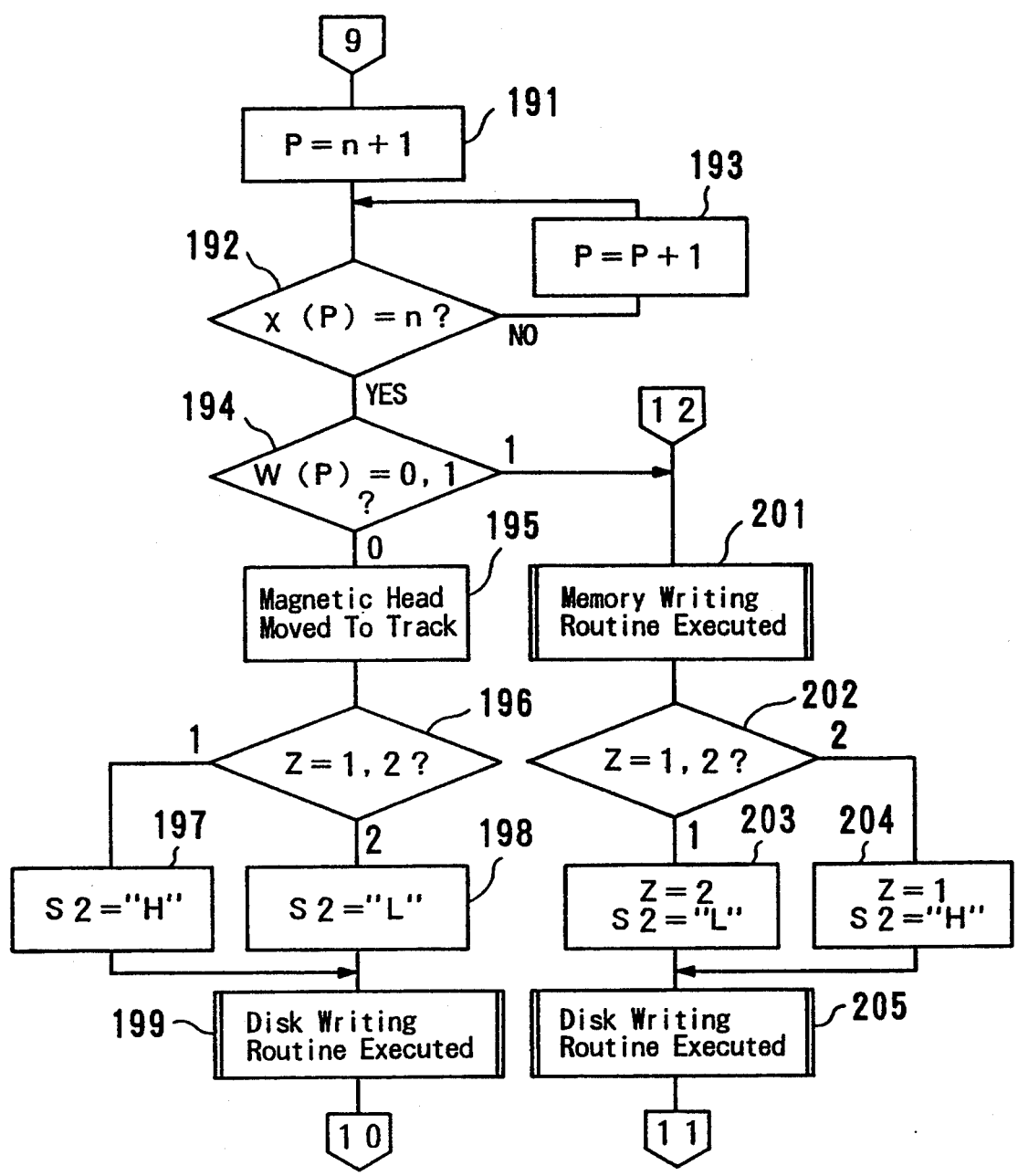
FIG. 7 is a flowchart of the main program, the flowchart showing a second part of the process in which the contents of each track are transfered to another track.
Figure 8:
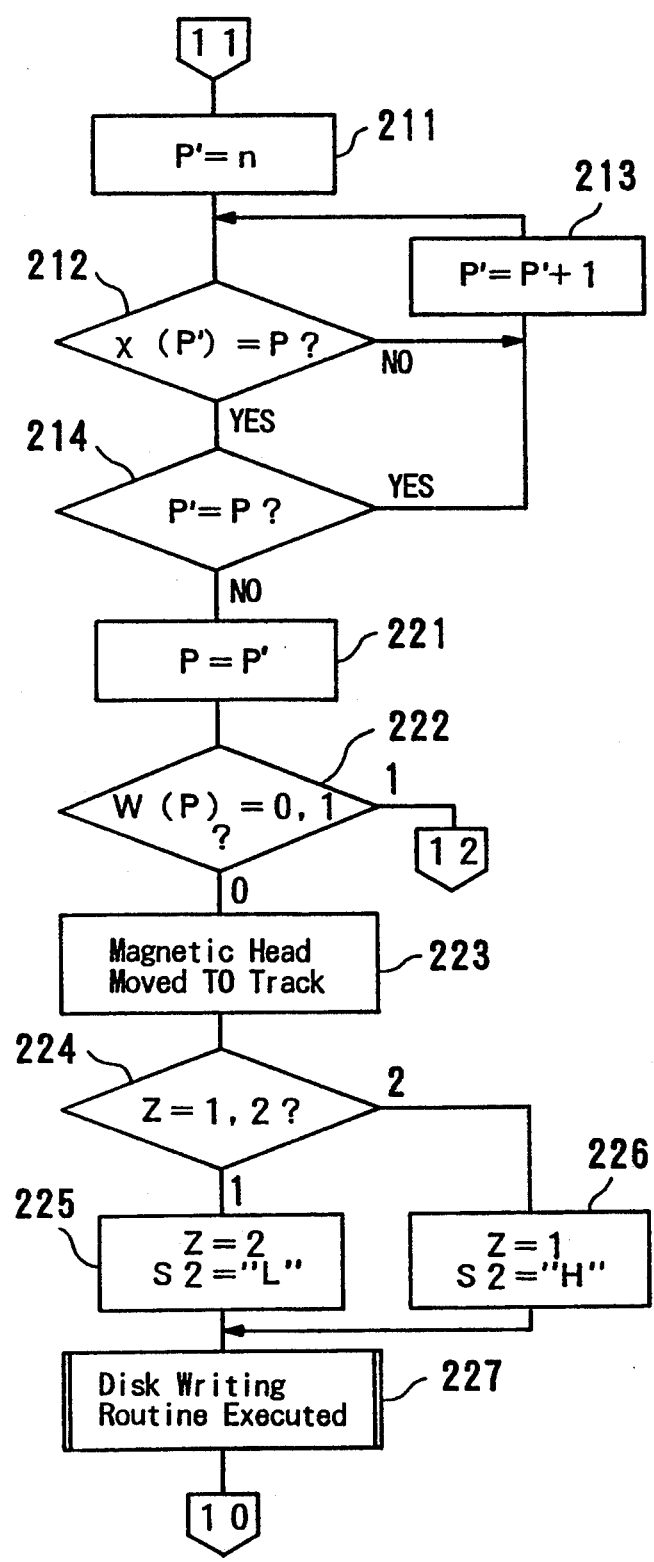
FIG. 8 is a flowchart of the main program, the flowchart showing a third part of the process in which the contents of each track are transfered to another track.
Figure 9:
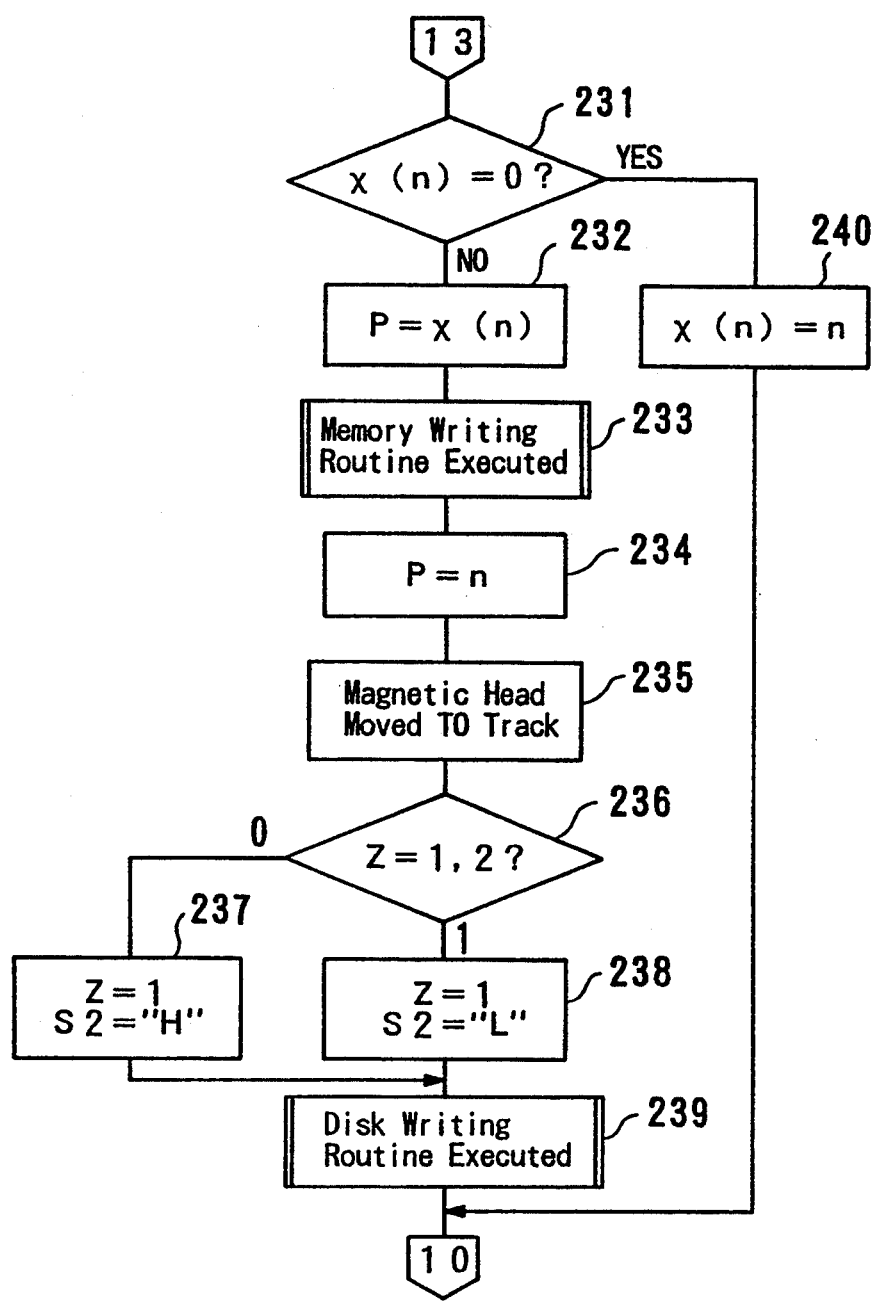
FIG. 9 is a flowchart of the main program, the flowchart showing a fourth part of the process in which the contents of each track are transfered to another track.

The present invention will now be described with reference to embodiments shown in the drawings.

FIG. 1 (i.e., FIGS 1A and 1B) shows a circuit of a still video device to which an embodiment of the present invention is applied. In this device, image signals have been recorded on a recording media or a magnetic disk D, and as described below, an image signal recorded on a track can be transferred to another track and an image signal which has been recorded on the other track can be transferred to the first track or to any other track.

A control circuit 11 is a microcomputer controlling the still video device as a whole, and having a memory 12. An indication unit 13 indicating a setting condition of the still video device, an operation unit 14 including various kinds of operation switches, and a buzzer outputting an alarm sound are connected to the control circuit 11. The buzzer outputs the alarm sound when, for example, an editing operation is impossible.

The magnetic disk D is rotated by a spindle motor 21, which is controlled and driven by a spindle motor servo or control circuit 22. A PG coil 23 is provided for sensing a rotation timing of the magnetic disk D to output the sensed signal to the spindle motor servo or control circuit 22, which is controlled by the control circuit 11 so that the spindle motor 21 is rotated at a constant rotation speed of 3600 rpm, for example. A magnetic head 24 is controlled by a tracking motor 25 to displace along a radial direction of the magnetic disk D. The tracking motor 25 is controlled by the control circuit 11. Namely, while the magnetic disk D is being rotated, the magnetic head 24 is positioned at a predetermined track of the magnetic disk D, so that an image signal and other signals are recorded on this track, or an image signal and other signals recorded on the track are read from this track.

The image signal is inputted through a video terminal 31 in the form of a composite signal in the NTSC (National Television System Committee color system) Format, for example. This image signal is divided into a luminance signal (Y+S) and differential color signals (R−Y, B−Y) by a decoder 32. The differential color signals (R−Y, B−Y) are arranged alternately at every 1H (horizontal scanning period) by an LSC conversion circuit 33, and are outputted as a color-difference line-sequential signal (LSC). The luminance signal (Y+S) is inputted to a frequency-modulation circuit 36 through a record-editing switch 34. The color-difference line-sequential signal (LSC) is inputted to the frequency-modulation circuit 36 through a record-editing switch 35. The luminance signal (Y+S) and the color-difference line-sequential signal (LSC) are frequency-modulated by the frequency-modulation circuit 36, and then amplified by a recording head amplifier 37. These signals are transmitted to the magnetic head 24 through a head switch 38 to be recorded on a predetermined track of the magnetic disk D.

The record-editing switches 34 and 35 are controlled and switched by the control circuit 11. Namely, the record-editing switches 34, 35 are switched to the LSC conversion circuit 33 when an image signal inputted through the video input terminal 31 is recorded on the magnetic disk D, and are switched to DA converters 64 and 67, respectively, when image signals recorded on the magnetic disk D are edited. Similarly, the head switch 38 is controlled by the control circuit 11. Namely, the head switch 38 is switched to the recording head amplifier 37 when an image signal inputted through the video terminal 31 is recorded on the magnetic disk D, and switched between the recording head amplifier 37 and a head amplifier 41 when image signals recorded on the magnetic disk D are edited.

The head amplifier 41 is connected to an auto-gain control (AGC) amplifier 42, to which a frequency-demodulation circuit 43 is connected. The frequency-demodulation circuit 43 is connected to AD converters 44 and 45. The AD converter 44 is connected to a first Y-memory 51 and a second Y-memory 52 through a writing memory switch 46. The AD converter 45 is connected to a first LSC-memory 53 and a second LSC-memory 54 through a writing memory switch 47. The frequency-demodulation circuit 43 outputs a luminance signal (Y+S) and a color-difference line-sequential signal (LSC), respectively. The luminance signal is AD-converted by the AD converter 44, and then stored in the first Y-memory 51 or the second Y-memory 52 through the writing memory switch 46. The color-difference line-sequential signal is AD-converted by the AD converter 45, and then stored in the first LSC-memory 53 or the second LSC-memory 54 through the writing memory switch 47.

Each of the first Y-memory 51, the second Y-memory 52, the first LSC-memory 53 and the second LSC-memory 54 has a storage capacity corresponding to an image signal recorded on one track of the magnetic disk D.

A horizontal synchronizing signal and a vertical synchronizing signal which are included in the luminance signal outputted from the frequency-demodulation circuit 43 are separated from the luminance signal by a synchronizing signal separation circuit 55, which is connected to a writing sampling pulse generating circuit 56. The writing sampling pulse generating circuit 56 generates a sampling pulse in accordance with the horizontal synchronizing signal and the vertical synchronizing signal which are outputted from the synchronizing signal separation circuit 55, and outputs the sampling pulse to the AD converters 44, 45, and a writing address counter generating circuit 57. The AD converters 44 and 45 AD-convert the luminance signal and the color-difference line-sequential signal which are outputted from the frequency-demodulation circuit 43 respectively, in synchronization with the sampling pulse. The writing address counter generating circuit 57 designates, in synchronization with the sampling pulse, addresses of the first and second Y-memories 51, 52 and the first and second LSC-memories 53, 54 in which the AD-converted luminance signal and the AD-converted color-difference line-sequential signal are to be written.

The writing memory switches 46 and 47 are controlled by the control circuit 11 to be switched. Namely, the writing memory switches 46 and 47 are switched to the first Y-memory 51 and the first LSC-memory 53, respectively, when an "H" (high) signal is inputted from the control circuit 11 to the writing memory switches 46 and 47. The writing memory switches 46 and 47 are switched to the second Y-memory 52 and the second LSC-memory 54, respectively, when an "L" (low) signal is inputted from the control circuit 11 to the writing memory switches 46 and 47.

The first Y-memory 51 and the second Y-memory 52 are connected to a reading memory switch 61, which is connected to a reproduction-editing switch 62. The reproduction-editing switch 62 is connected to a reproduction circuit 63 and a DA converter 64. On the other hand, the first LSC-memory 53 and the second LSC-memory 54 are connected to a reading memory switch 65, which is connected to a reproduction-editing switch 66. The reproduction-editing switch 66 is connected to the reproduction circuit 63 and a DA converter 67.

A standard synchronizing signal generating circuit 71 outputs a standard synchronizing signal, and a reading sampling pulse generating circuit 72 generates a reading sampling pulse in accordance with the standard synchronizing signal. The reading sampling pulse generating circuit 72 outputs this reading sampling pulse to a reading address counter 73, the AD converters 64, 67, the reproduction circuit 63 and DA converters 81, 82 and 83. The reading address counter 73 designates, in synchronization with the sampling pulse, addresses of the first and second Y-memories 51, 52 and the first and second LSC-memories 53, 54 in which the luminance signal and the color-difference line-sequential signal, which are to be read, are stored. The DA-converters 64 and 67 DA-convert, in synchronization with the sampling pulse, the luminance signal and the color-difference line-sequential signal which are outputted from the first or second Y-memory 51 or 52 and the first or second LSC-memory 53 or 54, respectively.

The reading memory switches 61 and 65 are controlled by the control circuit 11 to be switched. Namely, the reading memory switches 61 and 65 are switched to the first Y-memory 51 and the first LSC-memory 53, respectively, when an "H" signal is inputted from the control circuit 11, and switched to the second Y-memory 52 and the second LSC-memory 54, respectively, when an "L" signal is inputted from the control circuit 11. The reproduction-editing switches 62 and 66 are also controlled by the control circuit 11. Namely, the reproduction-editing switches 62 and 66 are switched to the reproduction circuit 63 when an "H" signal is inputted from the control circuit 11; and switched to the DA converters 64 and 67, respectively, when an "L" signal is inputted from the control circuit 11, so that image signals read from the first or second Y-memory 51 or 52, and the first or second LSC-memory 53 or 54 are transmitted to the reproduction circuit 63 or the DA converters 64 and 67.

A luminance signal outputted from the DA converter 64, and a color-difference line-sequential signal outputted from the DA converter 67, are inputted into the frequency-demodulation circuit 36 through the record-editing switches 34 and 35, respectively, to be frequency-demodulated. These signals are then amplified by the recording head amplifier 37, and transmitted through the head switch 38 to the magnetic head 24 to be recorded on a predetermined track of the magnetic disk D.

On the other hand, image signals inputted to the reproduction circuit 63, through the reproduction-editing switches 62 and 66, are subjected to predetermined processes by the reproduction circuit 63, and divided into a luminance signal (Y+S) and two differential color signals (R−Y, B−Y). These signals are then DA-converted by the DA-converters 81, 82 and 83, respectively, and converted by an encoder 84 to a composite video signal in the NTSC system. Format to be outputted through a video output terminal 85.

A character indication circuit 86 is provided for adding character information such as a track number, for example, to an image signal outputted from the video output terminal 85. The character indication circuit 86 generates the character information in accordance with a signal outputted from the control circuit 11, and outputs the character information to the encoder 84.

Figure 10:
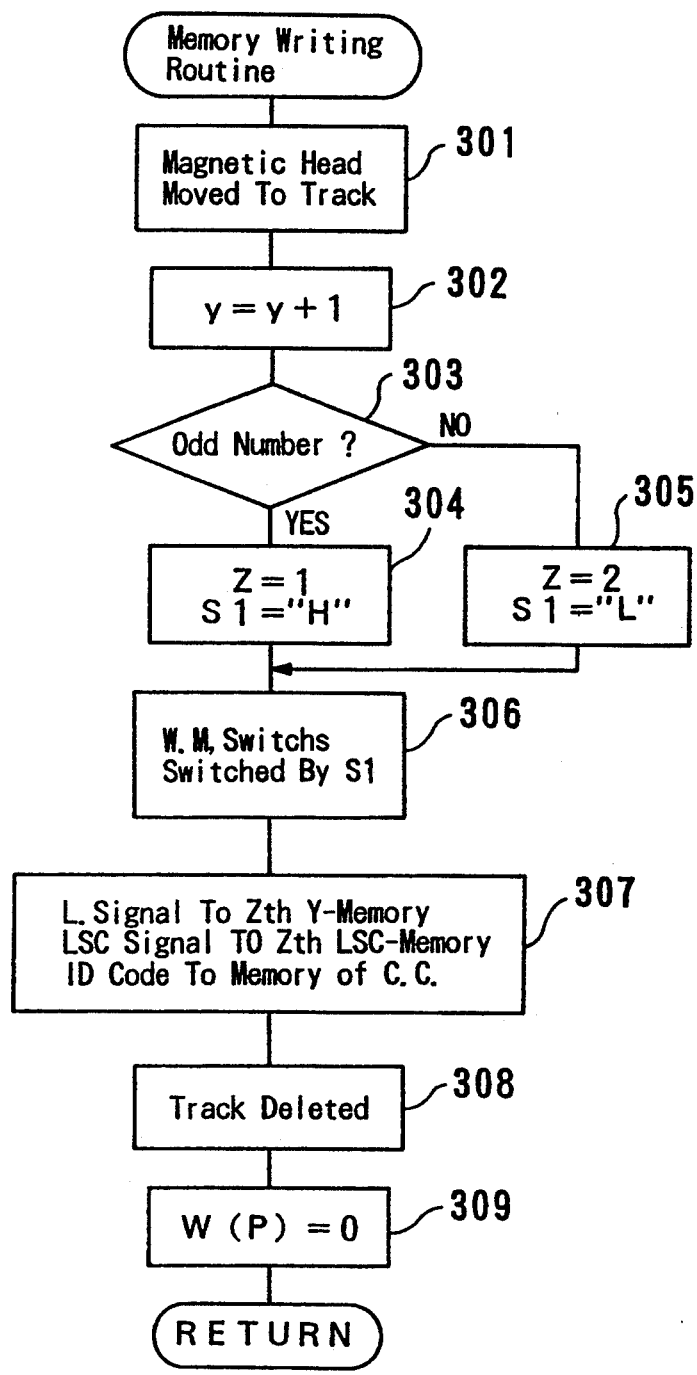
FIG. 10 is a flowchart of a memory writing routine.
Figure 11:
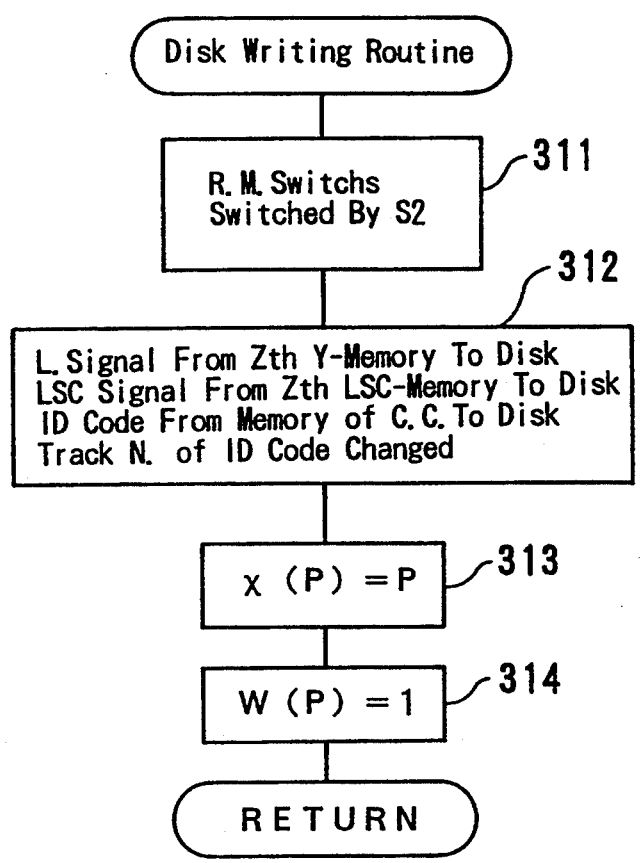
FIG. 11 is a flowchart of a disk writing routine.

FIGS. 2 through 11 show flowcharts of programs by which an editing operation of an image signal is carried out in the still video editing device. FIGS. 2 through 9 show flowcharts of a main routine, FIG. 10 shows a flowchart of a memory writing routine, and FIG. 11 shows a flowchart of a disk writing routine. FIG. 12 shows an example of each of the variables used in the programs. With reference to FIG. 12, the flowcharts are described below.

Note, in the variable $V(n)$ of "State Before Editing" in FIG. 12, the reference "F" means a field record mode, the reference "1" means an outside track of a pair of tracks on which image signals are recorded in a frame record mode, the reference "2" means an inside track of a pair of tracks of which image signals are recorded in the frame record mode, and the reference "0" means a blank track on which no signal is recorded. A source track number $x(n)$ means a track number of a track on which an image signal that is recorded on a number "n" track after editing, was recorded before editing.

In an editing operation of the embodiment, it is possible for an image signal recorded on a track to be transferred to another track, and a predetermined track to be changed to a blank track. However, it is impossible for an image signal recorded on a track to be copied to more than one track, and for the number of blank tracks which existed before editing to be increased or decreased by the editing operation. In other words, the editing device of the embodiment can only change the order of image signals recorded on each of the tracks, and cannot copy the contents of one track to a plurality of tracks. This is because, for example, when all of the tracks have been recorded, if an image signal recorded on one track were to be copied to a plurality of tracks, the other image signals would be erroneously erased.

suppose that it is determined in Step 101 that a power switch of the operation unit 14 (FIG. 1) is turned ON, it is determined in Step 102 that a magnetic disk D is inserted in the disk device of the still video device, and it is determined in Step 103 that an editing switch of the operation unit 14 is turned ON. In this case, the process goes to Step 104, so that an editing operation is started. Conversely, when it is determined in any one of Steps 101, 102 and 103 that the condition is "NO", this program is immediately ended.

In Step 104, counters "n" and "c" are each set to "0". Note, the counter "n" corresponds to a track number of the magnetic disk D. In Step 105, rotation of the spindle motor 21 is started, and servo control of the spindle motor 21 is started. When the rotation of the spindle motor 21 becomes stable and enters a lock-in condition, the process goes from Step 106 to Step 111.

In Steps 111 through 126, a recorded state of the magnetic disk D is sensed, and the variables $W(n)$ and $f(n)$ of FIG. 12 are set. The recorded state is a condition in which signals were recorded on the magnetic disk D before the editing operation is carried out.

In Step 111, the counter "n" is increased by 1, and in Step 112, it is determined whether or not the counter "n" reaches "51". After the execution of this program has started, and before the counter "n" has yet reached "51", the process goes to Step 112.

In Step 113, a track search is carried out for the number "n" track. Namely, based on signals read from this track, it is sensed whether or not an image signal has been recorded on the track, and when it is sensed that a signal has been recorded, information indicating whether or not the signal was recorded in the field record mode or the frame record mode, and so on, is sensed.

In Step 114, it is determined whether of not the number "n" track has been recorded, and what kind of signals have been recorded. In the example shown in FIG. 12, the variable V(n) of the first track is "F", which shows that an image signal is recorded in the field record mode. Therefore, regarding the first track, the variable W(n) is set to "1" in Step 115. Then, in Step 116, it is determined whether the signal bas been recorded in the frame record mode. Since the first track has been recorded in the field record mode, the process goes to Step 129, in which the variable f(n) is set to "0", and then the process returns to Step 111.

Then, regarding the second track, similar to the first track, the track search is carried out in Step 113. Since the second track is recorded in the field record mode, Steps 114, 115 116 and 123 are executed in this order, so that the variable W(n) is set to "1", and the variable f(n) is set to "0". The same process is executed for the third track.

The fourth track is recorded in the frame record mode, and a track forming a pair with the fourth track is the fifth track located inside of and adjacent to the fourth track. Therefore, in the case of the fourth track, after the variable W(n) is set to "1" in Step 115, the process goes from Step 116 to Step 117, in which the variable f(n) is set to "1". The counter "n" is then increased by 1 to be set to "5" in Step 118, the variable W(n) is set to "1" in Step 119, and the variable f(n) is set to "2" in Step 120. Namely, in the case of the frame record mode, the variable f(n) is set to "1" for an outside track of the magnetic disk D, and the variable f(n) is set to "2" for an adjacent inside track of the magnetic disk D. Thus, in the frame mode, an image signal forming a pair with another image signal is always recorded on a track adjacent to the track on which the other image signal is recorded.

Then, the process returns to Step 111, so that a recording state of the next track is sensed in the same manner as described above.

No signal is recorded in the sixth track. Therefore, the process goes from Step 114 to Step 121, so that the variable W(n) is set to "0", and then, the counter "c" is increased by 1 in Step 122. Then, in Step 123, the variable f(n) is set to "0", and the process returns to Step 111. Namely, the counter "c" is increased by 1 every time a non-recorded track is sensed, and therefore, when Steps 111 through 126 are completed for all of the tracks, the value of the counter "c" indicates the number of blank tracks on which no signal is recorded.

Thus, the variable W(n) is set to "1" for a recorded track, and the variable W(n) is set to "0" for a non-recorded track. In the case of a recorded track, the variable f(n) is set to "0" for the field record mode, the variable f(n) is set to "1" for an outside track in the frame record mode, and the variable f(n) is set to "2" for an inside track in the frame record mode.

Conversely, when it is determined in Step 114 that an audio signal has been recorded on the magnetic disk D, an editing operation cannot be carried out for this magnetic disk D. Therefore, the counters "n" and are "c" each set to "0", in Step 124, and an alarm indicating that an editing operation is impossible is outputted by a monitor or a buzzer 15 in Step 125. Then, after it is confirmed in Step 126 that the magnetic disk D is ejected from the still video device, the process returns to Step 102 so that an editing operation can be carried out for a next magnetic disk.

In this embodiment, the number of tracks on the magnetic disk D, on which image signals can be recorded is 50 in all. Therefore, when the recorded states of all of the tracks have been sensed, it is determined in Step 112 that the counter has reached "51", and as a result, the process goes to Step 131.

Note, information such as a state before an editing operation for each track and the number of blank tracks in the magnetic disk is stored in the memory 12, to be used for an indication of the character indication circuit 86 and some processes described later.

Steps 131 through 165 are provided for carrying out a process for determining a recorded state after an editing operation. Namely, in this process, the source track number x(n) is set for each track, so that after the editing operation is carried out, the recorded state of each image signal recorded on the magnetic disk D is determined. Further, in this process, an image signal, recorded on a track before the editing is prevented from being copied to more than one track. Namely, as described above, in this embodiment, only the order of image signals recorded on each of the tracks is changed, and a signal recorded on one track cannot be copied to a plurality of tracks. Therefore, in Steps 131 through 165, an operation in which one track is to be transferred to a plurality of tracks is prevented.

In Step 131, the rotation of the spindle motor 21 is stopped. Then, in Step 132, a recorded state before the editing of the magnetic disk D, i.e., the variable V(n) of FIG. 12 is indicated on a video monitor by an operation of the character indication circuit 86. FIG. 13 shows an example of this monitor indication.

In Step 133, counters "n" and "c" are each set to "0". In Step 134, the counter "n" is increased by 1, and in Step 136, it is determined whether or not the counter "n" has reached "51". When the recording state after the editing operations for all of the tracks have been set by the process of Steps 121 through 165, it is determined in Step 136 that the counter "n" has reached "51". Therefore, the process goes to Step 171 so that each of the image signals is actually transferred from one track to another track. Conversely, when it is determined in Step 136 that the counter "n" has not reached "51" yet, the process goes to Step 141.

In Step 141, key input operations through the operation unit 14 are carried out by an operator, and it is determined whether or not a variable "m", indicating a recording state after editing, has been inputted. This variable "m" represents a track number of a track on which an image signal, which is to be transferred to a particular track, is now recorded. Namely, the variable "m" is a track number of the source track. When the particular track is intended to become a blank track, the variable "m" is set to "0".

When the key input operations are finished, the contents of the key input operations are indicated on the video monitor in Step 142. FIG. 14 shows an example of this indication. In this example, at present, the key input operations have been finished as far the seventh track, and "1", "2", "0", "0", "4", "5", "3" are the source track numbers, respectively. Namely, in the example, while the first and the second tracks are not to be changed, the third and the fourth tracks are set to become blank tracks, and the fifth, the sixth and the seventh tracks are set in such a manner that image signals presently on the fourth, the fifth and the third tracks are to be transferred to the fifth, the sixth and the seventh tracks, respectively.

It is determined in Step 143 whether or not the variable "m" inputted in Step 141 is "0", i.e., whether or not the track is set so as to become a blank track. When the track is intended to become a blank track, the counter "c'" is increased by 1 in Step 144. It is determined in Step 145 whether or not the value of the counter "c'" exceeds the value of the counter "c" set in Step 122, i.e., whether or not the value of the counter "c'" exceeds the number of blank tracks before the editing. In this embodiment, as described above, the contents recorded on one track cannot be transferred to a plurality of tracks. Therefore, when it is determined in Step 145 that the number of non-recorded tracks which exist after the editing operation exceeds the number of non-recorded tracks which exist before the editing operation, an alarm indicating an editing error is outputted through the video monitor or buzzer 15 in Step 147. Then, the process returns to Step 133, so that a setting operation, in which a recording state after the editing operation is determined, is started again from the first track.

Conversely, when it is determined in Step 145 that the value of the counter "c'" does not exceed the number of blank tracks before the editing operation, the source track number x(n) is set to "0" in Step 146. As described above, the source track number x(n) is a track number of a track on which an image signal, which is to be transferred to the number "n" track, is recorded before the editing operation. Namely, when a track is intended to become a blank track, the source track number x(n) is set to "0". In the example shown in FIG. 12, since the third track is to become a blank track by the editing operation, the source track number x(n) is set to "0". After this operation of Step 146, the process returns to Step 134, and thus, a recording State to be entered after the editing operation is set for the next track similar to the above. Note, the source track number x(n) is stored in the memory 12 whenever the source track number x(n) is set, the address of the memory 12 corresponding to the track number of the number "n" track.

On the other hand, when it is determined in Step 143 that the variable "m" is not "0", i.e., when the contents of a number "m" track, on which an image signal is recorded, is intended to be transferred to a track for which a recorded state after the editing operation is now being set, the process goes to Step 151, in which it is determined whether the variable f(m) of the number "m" track is "0", "1" or "2". Namely in Step 151, it is determined whether or not a record mode for the number "m" track is the field record mode, or whether the track corresponds to an outside track or inside track in the frame record mode.

In the example shown in FIG. 14, the variable "m" is set to "3" for the seventh track, and the variable f(n) of the third track is "0". Therefore, the process goes to Step 152, in which the source track number x(n) of the seventh track is set to "3" (see FIG. 12).

On the other hand, for the fifth track, the variable "m" is "4" (see FIG. 14), and the variable f(n) of the fourth track on which the image signal to be transferred to the fifth track is recorded is "1" (see FIG. 12). Therefore, in this case, the process goes to Step 153, in which it is determined that the counter "n" is not "50". Accordingly, the process goes to Step 154, in which "4" is set as the source track number x(n). Then, the counter "n" is increased by 1 in Step 155, so that, in Step 156, "5" is set as the source track number x(n) of the sixth track. Thus, regarding the fifth and sixth tracks, the source track numbers x(n) are set to "4" and "5", respectively.

As described above, in case of the frame record mode, it is a prerequisite that an image signal of the first field and an image of the second field must be recorded on two adjacent tracks. In other words, an image signal forming a pair with another image signal is recorded on a track adjacent to a track on which the other signal is recorded. In the fourth and fifth tracks in the example shown in FIG. 12, by merely carrying out an operation by which the image signal of the fourth track is set to be transferred to the fifth track, an operation by which the image signal of the fifth track is set to be transferred to the sixth track is automatically carried out.

Note, when it is determined in Step 153 that the counter "n" is "50", i.e., when the 50th track, which is located at the innermost position of the magnetic disk is selected, and an image signal recorded on an outside track in the frame record mode is intended to be transferred to the 50th track, namely, when there is no track to which the image signal recorded in the inside track of the frame mode can be transferred, the process goes from Step 153 to Step 147, and thus an editing error alarm is outputted. Also, when the variable "m" set in Step 141 corresponds to an inside track recorded in the frame record mode, the process goes from Step 151 to Step 147, and an editing error alarm is outputted. Thus, the editing error alarm is outputted when it is determined that an attempt has been made to record an image signal in an impossible manner.

In Steps 161 through 165, it is sensed whether or not the source track number x(n) which has been set in Step 152 or 156 is set to be recorded to a plurality of tracks. In explaining the operation of Steps 161 through 165, as shown in FIG. 14, it is supposed that the source track numbers x(n) have been set as far the seventh track, at present. Namely, at present, the counter "n" is "7" and the source track number x(n) corresponding thereto is "3".

First, the counter "k" is set to "0" in Step 161, and the counter "k" is increased by 1 in Step 162. Since, in Step 163, the counter "k"(=1) is not equal to the counter "n" (=7) indicating the seventh track, the process goes to Step 164, in which it is determined whether or not the source track number x(7) is equal to the source track number x(1). Referring to FIG. 12, the source track number x(1) is "1" which is not equal to the source track number x(7). Therefore, the process returns to Step 162, in which the counter "k" is increased by 1. Similarly to the above, it is determined in Step 164 whether the source track number x(7) is equal to the source track numbers x(2) through x(6), respectively. Then, when the counter "k" becomes equal to "7", the process goes from Step 163 to Step 134, so that the source track number x(n) is set for the eighth track, and then the process described above is carried out.

Thus, when it is determined in Step 164 that the source track number x(n) set at present is equal to any one of the source track numbers x(k) which have been set so far at that time, Step 165 is executed. When both the source track number x(n) and the source track number x(k) are "0", since there can be a plurality of blank tracks, the process goes from Step 165 to Step 162. Conversely, when neither the source track number x(n) nor the source track number x(k) is "0", this means that the source track number x(n) which is now set has already been set. In other words, a signal which has already been recorded on a track by the editing operation has been chosen again to be recorded on a track. Therefore, the process goes to Step 147, in which an editing error alarm is outputted.

Thus, when the source track number x(n) has been set for all the tracks, since it is determined in Step 136 that the counter "n" has reached "51", the process goes from Step 136 to Step 171.

In Steps 171 through 240, the contents of each track are transferred to a destination track which has been set by operations of Steps 131 through 165. First, in Step 171, the counters "n" and "y" are each set to "0", and in Step 172, the spindle motor rotation is started. When it is determined in Step 173 that the rotation of the spindle motor has become constant, i.e., a lock-in condition has been achieved, the process goes to Step 174, in which the counter "n" is increased by 1. When it is determined in Step 175 that the counter "n" has reached "51", since the editing operations have already been finished for all of the tracks, the spindle motor is stopped in Step 176, and then this program is ended. Conversely, when the counter "n" has not reached "51",a transfer of an image signal from one track to another track, i.e. the editing operation, is carried out in Step 181 and the following Steps.

In Step 181, it is determined whether or not the counter "n" indicating the track number is coincident with the source track number x(n). When the counter "n" is coincident with the source track number x(n), this means that a predetermined image signal has already been recorded on that track, and therefore no editing operation is needed for that track. In FIG. 12, for example, since the counter "n" is coincident with the source track number x(n) of the first track, the process returns to Step 174 so that the check is carried out for the second track. For the second track, similarly to the first track, the counter "n" is coincident with the source track number x(n), and thus the process returns to Step 174. For the third track, since the source track number x(n) is "0" which is not coincident with the counter "n", Step 182 and the following Steps are executed.

In Step 182, it is determined whether or not the variable W(n) is "0" or "1". Since the variable W(n) of the third track is "1", the counter "p" is set to the value in the counter "n" (=3) in Step 183. Then, in Step 184, the memory writing routine is executed so that the image signal on the third track is stored in the memory.

In the memory writing routine (FIG. 10), in Step 301, the magnetic head 24 is moved to the third track for which the editing operation is to be carried out. The counter "y" is increased by 1 in Step 302, and it is determined in Step 303 whether or not the counter "y" is an odd number. When this routine is executed for the first time, since it is determined in Step 303 that the counter "y" is an odd number (=1), Step 304 is executed, in which the variable "Z" is set to "1" and the control signal "S1" is set to "H" (high). In Step 306, due to the control signal "S1" being high, the writing memory switches 46 and 47 (FIG. 1) are switched to the first Y-memory 51 and the first LSC-memory 53. Then, in Step 307, signals on the third track are written in the memories. Namely, the luminance signal is written in the first Y-memory 51, the color-difference line-sequential signal is written in the first LSC-memory 53, and the ID code is written in the memory 12 of the control circuit 11, respectively. Note, the ID code contains information such as a track number, a photographing date and so on, as is well known.

Thus, after the signals on the third track are stored in the memories 51, 53 and 12 in Step 307, the signals recorded on the third track are erased in Step 308. Namely, the third track becomes a blank track, and then, in Step 309, the variable W(p) is set to "0" indicating a blank track.

The process then returns to the main routine, again. In Step 185, it is determined whether or not the source track number x(n) is "0". Since the source track number x(n) of the third track is "0", Step 186 is executed, and thus the counter "n" is set as the source track number x(n) of the third track. Accordingly, it is determined that a state exists in which the editing operation has already been completed for the third track.

In Steps 191 through 193, a destination track, to which the signals of the third track which are stored at present in the memories 51, 53 and 12 are to be transferred, is sensed. First, in Step 191, the counter "p" is set to a value (=4) which is obtained by adding 1 to the counter "n". In Step 192, it is determined whether or not the source track number x(p) of the fourth track is the same as the counter "n" (=3). In this case, the source track number x(p) of the fourth track is "0", which is not the same as the counter "n". Therefore, the counter "p" is increased by 1 in Step 193, and then Step 192 is executed. Then, when the counter "p" reaches "7", since it is determined in Step 192 that the source track number x(n) of the seventh track is coincident with the counter "n", the process goes to Step 194. Thus, it is sensed that the destination-track to which the contents of the third track are to be transferred is the seventh track.

It is determined in Step 194 whether the variable W(p) of the seventh track is "0" or "1". This variable W(p) is "0", which means that the seventh track is a blank track. Therefore, Steps 195 through 199 are then executed, so that the image signal and the other signals of the third track stored in the memories 51, 53 and 12 are written in the seventh track.

In Step 195, the magnetic head 24 is moved to the seventh track for which the editing operation is to be carried out. It is determined in Step 196 whether the variable "z" is "1" or "2". Since the variable "z" is now "1", Step 197 is executed in which the control signal "S2" is set to "H", and in Step 199, the disk writing routine is executed.

In the disk writing routine (FIG. 11 ), in Step 311, the reading memory switches 61 and 65 (FIG. 1) are switched to the first Y-memory 51 and the first LSC-memory 53, respectively, according to the control signal "S2". Then, in Step 312, signals from the third track are read out from each of the memories. Namely, the luminance signal is read from the first Y-memory 51, the color-difference line-sequential signal is read from the first LSC-memory 53, and the ID code is read from the memory 12 of the control circuit 11 respectively. At this time, the track number of the ID code is changed to "7" so as to conform to the track number of the destination track to which the signals are to be transferred. Thus, the luminance signal, the color-difference line-sequential signal and the ID code in which the track number has been changed from "3" to "7", are read from the memories and written on the seventh track.

In Step 313, the counter "p" (=7) is set to the source track number of the seventh track, and this means that the editing operation for the seventh track has been finished. In Step 314, the value "1" indicating that an image signal has been recorded is set in the variable W(p) of the seventh track.

Then, the process returns to the main routine, and thus Step 174 is executed, in which the variable "n" (=3) is increased by 1. As a result, the variable "n" becomes "4", and thus the process goes from Step 181 to Step 182, so that an editing operation for the fourth track is carried out.

It is determined in Step 182 whether the variable W(n) of the fourth track is "0" or "1". Since the variable W(n) of the fourth track is "1", the counter "p" is set to the value in the counter "n" (=4) in Step 184, then, in Step 184, the memory writing routine is executed so that the image signal of the fourth track is stored in the memories.

In Step 301 of the memory writing routine, the magnetic head 24 is moved to the fourth track for which the editing operation is to be carried out, end in Step 302, the counter "y" is increased by 1. It is determined in Step 303 whether or not the counter "y" is an odd number. Although the counter "y" was an add number in the previous execution of this routine, the counter "y" has become an even number by the present execution of Step 302. Therefore, the process goes from Step 303 to Step 305, in which the variable "Z" is set to "2" and the control signal "S1" is set to "L" (low). In Step 306, according to the control signal "S1", the writing memory switches 46 and 47 (FIG. 1) are switched to the second Y-memory 52 and the second LSC-memory 54. Then, in Step 307, signals on the fourth track are written in the memories. Namely, the luminance signal is written in the second Y-memory 52, the color-difference line-sequential signal is written in the first LSC-memory 54, and the ID code is written in the memory 12 of the control circuit 11, respectively.

In Step 308, the contents of the fourth track are erased, and as a result, the fourth track becomes a blank track, and then, in Step 309, the variable W(p) is set to "0" indicating the blank track.

Then, in the main routine, it is determined in Step 185 whether or not the source track number x(n) of the fourth track is "0". Since the source track number x(n) of the fourth track is "0", similar to the third track, Step 186 is executed, and thus the source track number x(n) of the fourth track is set to the counter "n"(=4). As a result, the fact that the editing operation for the fourth track has been completed is indicated by the counter x(n) (=4).

In Steps 191 through 193, a destination track, to which the signals of the fourth track which are stored at present in the memories 51, 53 and 12 are to be transferred, is sensed. In Step 191, the counter "p" is set to a value obtained by adding 1 to the counter "n", i.e., "5". In Step 192, it is determined whether or not the source track number x(p) of the fifth track is coincident with the counter "n" (=4). Since the source track number x(p) of the fifth track is "4" which is coincident with the counter "n", it is determined that the destination track to which the contents of the fourth track are to be transferred is the fifth track, and the process goes to Step 194. It is determined in Step 194 whether the variable W(p) of the fifth track is "0". This variable W(p) is "1", which means that an image signal has been recorded on the fifth track. Therefore, in this case, the memory writing routine is executed in Step 201, so that an image signal and the other signals of the fifth track are stored in the memories.

In Step 301 of the memory writing routine, the magnetic head 24 is moved to the fifth track, and the counter "y" is increased by 1 in Step 302. In Step 303, it is determined whether or not the counter "y" is an odd number. Although the counter "y" was set to an even number in the previous execution, the counter "y" has been changed to an odd number by the present execution of Step 302. Therefore, Step 304 is executed, so that the variable "Z" is set to "1" and the control signal "S1" is set to "H". In Step 306, according to the control signal "S1" the writing memory switches 46 and 47 (FIG. 1) are switched to the first Y-memory 51 and the first LSC-memory 53. Then, in Step 307, signals of the fifth track are written in the memories. Namely, the luminance signal is written in the first Y-memory 51, the color-difference line-sequential signal is written in the first LSC-memory 53, and the ID code is written in the memory 12 of the control circuit 11, respectively.

In Step 308, the contents of the fifth track are erased, and as a result, the fifth track becomes a blank track, and then, in Step 309, the variable W(p) is set to "0" indicating the blank track.

Then, in the main routine, it is determined in Step 202 whether the variable "Z" is "1" or "2". Since the variable "Z" is "1", Step 203 is executed so that the variable "Z" is set to "2" and the control signal "S1" is set to "L". Then, the disk writing routine is executed in Step 205.

In Step 311 of the disk writing routine, the reading memory switches 61 and 65 (FIG. 1) are switched to the second Y-memory 52 and the second LSC-memory 54, respectively, according to the control signal "S2". Then, in Step 312, signals of the fourth track are read out from the second Y-memory 52, the second LSC-memory 54 and the memory 12 of the control circuit 11, respectively. At this time, the track number of the ID code is changed to "5" so as to conform to the track number of the destination track to which the signals are to be transferred. Thus, the luminance signal, the color-difference line-sequential signal and the ID code are read from the memories and written on the fifth track.

In Step 313, the counter "p" (=5) is set to the source track number x(n) of the fifth track, so that it is indicated that the editing operation for the fifth track has been finished. In Step 314, the variable W(p) of the fifth track is set to the value "1" indicating that an image signal has been recorded on that track.

The process then returns to the main routine. In Steps 211 through 214, a destination track to which the signals of the fifth track which have been recorded before the editing operation, i.e., the signals stored in the memories 51, 53 and 12 are to be transferred, is sensed.

In Step 211, the counter "p" is set to the value in the counter "n", and thus the counter "p'" is set to "4". In Step 212, it is determined whether or not the source track number x(p') of the fourth track is the same as the counter "p" (=5). Now, since the source track number x(p) of the fourth track has been set to "4" by the an execution of Step 186, the process goes to Step 213, in which the counter "p'" is increased by 1 to be set to "5". It is then determined in Step 212 whether or not the source track number x(p') of the fifth track is the same as the counter "p". Since the source track number x(p') of the fifth track has already been set to "5" in Step 313 of the disk writing routine, Step 214 is executed. In Step 214, it is determined whether or not the counter "p'" is the same as the counter "p". Since these contents are now coincident with each other, the counter "p'" is increased by 1 in Step 213 to become "6". As a result, it is determined in Step 212 that the source track number x(p') of the sixth track is coincident with the counter "p" (=5). Since the source track number x(p') of the sixth track is "5" (see FIG. 12), the process goes to Step 214, in which it is determined that the counter "p'" (=6) is not the same as the counter "p". Therefore, Step 221 and the following Steps are executed, so that the signals of the fifth track are written on the magnetic disk.

In Step 221, the counter "p" is set to the value in the counter "p'" (=6), namely, the counter "p" is set to "6". It is determined in Step 222 whether the variable W(p) of the sixth track is "0" or "1". This variable W(p) is "0", which means that the sixth track is a blank track. Therefore, Steps 223 through 227 are then executed so that an image signal and the other signals of the fifth track which are stored in the memories 51, 53 and 12 are written on the sixth track.

In Step 223, the magnetic head 24 (FIG. 1) is moved to the sixth track to which the signals are on be recorded. It is determined in Step 24 whether the variable "Z" is "1" or "2". Since the variable "Z" is now "2", Step 226 is executed, so that the variable "Z" is set to "1" and the control signal "S2" is set to "H". Then, in Step 227, the disk writing routine is executed. In the disk writing routine (FIG. 11), according to the control signal "S2" the signals of the fifth track are read from the first Y-memory 51, the first LSC-memory 53 and the memory 12 of the control circuit 11. At this time, the track number in the ID code is changed to "6" to conform to the track number of the destination track to which the signals are to be transferred. Thus, the luminance signal, the color-difference line-sequential signal and the ID code which had been recorded on the fifth track are read from the memories and written on the sixth track.

Note, when it is determined in Step 222 that the variable W(p) of the sixth track is "1", the contents of the sixth track are written in the memories in Step 201, and then, the contents of the fifth track are written on the sixth track. Then, in Step 227, the contents of the sixth track are transferred from the memories to destination track.

The process again returns to the main routine, and thus Step 174 is executed, so that the variable "n" is increased by 1. As a result, the variable "n" becomes "5". On the other hand, it is determined in Step 181 that the source track number x(n) of the fifth track has been set to "5", which means editing operation is not needed. Therefore, the process returns to Step 174. Such an operation is repeatedly carried out, and then, when the variable "n" becomes "8", it is determined in Step 181 that the source track number x(n) of the eighth track is "10" and an editing is needed. Namely, the process goes to Step 182. The same operation as described above is then carried out, and the editing operation is again carried out.

Note, in the editing operation for the eighth track, since it is determined in Step 185 that the source track number x(n) is not "0", Step 186 is skipped. After this, in Step 313 of the disk writing routine, the source track number x(n) of the eighth track is set to "8".

For example, when the third track is a blank track and the contents of the ninth track are to be transferred to the third track, which is a different case from the example of FIG. 12, the source track number x(n) of the third track is set to "9". In this case, since the source track number W(n) is "0", the process goes from Step 182 to Step 231. Since the source track number x(n) is not "0", the process goes from Step 231 to Step 232, in which the counter "p" is set to the source track number x(n) (=9). Then, in Step 233, the memory writing routine is executed, so that the contents of the ninth track are written in the memories.

In Step 234, the counter "p" is set to the value (=3) of the counter "n", and in Step 235, the magnetic head is moved to the third track. Then, in Step 236, it is determined whether the value of the variable "Z" is "1" or "2", and Step 237 or 238 is executed in accordance with the variable "Z" set in the memory writing routine. Namely, the control signal "S2" is set to "H" or "L", and in Step 239, the disk writing routine is executed, and thus the contents of the ninth track stored in the memories are written on the third track. Then, the process returns to Step 174, so that an editing operation is carried out for the next track.

When the third track is a blank track and the source track number x(n) is "0", which is a different case from the above examples, the process goes from Step 182 to Step 231, and then Step 240 is executed. Namely, the source track number x(n) of the third track is set to the counter "n" (=3), and then the process returns to Step 174 so that an editing operation is carried out for the next track.

As described above, in the embodiment, first, signals recorded on a first track are stored in the first Y-memory 51 and the first. LSC-memory 53, and signals recorded on a second track are stored in the second Y-memory 52, and the second LSC-memory 54. Then, after the signals on the first and second tracks are erased, the signals stored in the first Y-memory 51 and the first LSC-memory 53 are recorded on the second track, and the signals stored in the second Y-memory 52 and the second LSC-memory 5a are recorded on the first track or another track.

Therefore, a signal recorded on each track of the magnetic disk can be edited by a single device. Namely, unlike a conventional system, two still video devices are not needed to carry out editing, and therefore, space and cost for a second device for editing is greatly reduced.

Note, although a magnetic disk is used as a recording medium in the above embodiment, the present invention is not restricted to the magnetic disk, i.e., any other recording medium including a memory card can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 4-46434 (filed on Jan. 20, 1992) which is expressly incorporated herein by reference in its entirety.

I claim:

1. A device for editing signals recorded in recording areas of a recording medium used for a still video device, said device comprising:
   a first memory in which a signal which is recorded in one recording area of said recording medium can be stored;
   a second memory in which a signal which is recorded in another recording area of said recording medium can be stored during the same time which the signal, in said first memory is stored;
   means for storing a signal recorded in a first recording area of said recording medium in said first memory, and for storing a signal recorded in a second recording area of said recording medium in said second memory while said signal from said first recording area remains stored in said first memory;
   means for erasing the signal recorded in said first recording area, after said storing means stores the signals in said first and second memories; and
   means for reading the signal recorded in said second memory so that the signal recorded in said second memory can be recorded in said first recording area.

2. A device according to claim 1, wherein the signals comprise image signals.

3. A device according to claim 1, further comprising means for sensing a recording state in which a signal has been recorded on said recording medium before an editing operation is carried out by said device.

4. A device according to claim 3, wherein said sensing means sense whether or not a signal is recorded in a recording area of said recording medium.

5. A device according to claim 3, wherein said sensing means sense whether the signal is recorded in a frame record mode or a field record mode.

6. A device according to claim 5, wherein, when said sensing means sense that the signal is recorded in the frame record mode, said sensing means assumes that another signal forming a pair with the first signal is recorded in a recording area adjacent to the recording area in which the first signal is recorded.

7. A device according to claim 3, wherein said sensing means sense whether or not a signal is an audio signal.

8. A device according to claim 7, further comprising means for outputting an alarm when said sensing means sense that an audio signal has been recorded on said recording medium.

9. A device according to claim 3, wherein said sensing means sense the number of recording areas in which no signal is recorded before an editing operation is carried out by said device.

10. A device according to claim 1, further comprising means for determining, after an editing operation is carried out by said device, but before said signal is recorded in said first recording area, a recording state in which a signal is recorded on said recording medium.

11. A device according to claim 10, further comprising means for preventing one signal recorded in a recording area of said recording medium before the editing operation, from being recorded in a plurality of recording areas of said recording medium.

12. A device according to claim 10, further comprising means for outputting an alarm when said determining means determine that the number of non-recorded areas which would exist, after performance of the editing operation, exceeds the number of non-recorded areas which exist before completing the editing operation.

13. A device according to claim 10, wherein, when said determining means determine that the signal is recorded in the frame record mode, said determining means also determine that the other signal forming a pair with the first signal is recorded in a recording area adjacent to the recording area in which the first signal is recorded.

14. A device according to claim 10, further comprising means for outputting an alarm when said determining means determine, after editing but before recording, that a signal would be recorded in an undesirable manner, in a recording state determined by said determining means, with respect to signal recordings before the editing operation.

15. A device according to claim 10, further comprising means for outputting an alarm when said determining means determine that a signal which has already been recorded in a recording area of the recording medium by an editing operation has been assigned to be recorded in another recording area of the recording medium.

16. A still video editing device comprising:
   a first memory in which an image signal recorded on one track of a disk can be stored;
   a second memory in which an image signal recorded on another track of the disk can be stored during the time which said first memory stores an image signal;
   means for storing an image signal recorded on a first track of the disk in one of said memories, and storing an image signal recorded on a second track of the disk in the other of said memories;
   means for erasing at least one image signal recorded on said first and second tracks, after said storing means stores the image signals in said memories; and
   means for reading the image signal to be recorded on another track from the memory and recording the image signal on the track from which the image signal has been erased.

* * * * *

UNITED STATES PATENT AND TRADEMARK OFFICE
CERTIFICATE OF CORRECTION

PATENT NO. : 5,359,465
DATED : October 25, 1994
INVENTOR(S) : Shunichi MIYADERA

It is certified that error appears in the above-indentified patent and that said Letters Patent is hereby corrected as shown below:

At column 17, line 33 (claim 4, line 2), change "sense" to ---senses---.
At column 17, line 36 (claim 5, line 2), change "sense whether the" to ---senses whether a---.
At column 17, line 38 (claim 6, line 2), change "sense that the signal is recorded in the" to ---senses that the signal is recorded in a---.
At column 17, line 45 (claim 7, line 2), change "sense" to ---senses---.
At column 17, line 49 (claim 8, line 3), change "sense" to ---senses---.
At column 17, line 52 (claim 9, line 2), change "sense" to ---senses---.
At column 18, line 17 (claim 13, line 2), change "determine" to ---determines---.
At column 18, line 19 (claim 13, line 4), change "determine that the other" to ---determines that another---.

Signed and Sealed this

Twenty-fifth Day of July, 1995

Attest:

BRUCE LEHMAN

Attesting Officer  Commissioner of Patents and Trademarks